(12) United States Patent
Oztaskent et al.

(10) Patent No.: US 8,555,327 B2
(45) Date of Patent: Oct. 8, 2013

(54) BROADCASTING LINKS TO ENHANCED CONTENT

(75) Inventors: Ant Oztaskent, Sutton (GB); Yaroslav Volovich, Cambridge (GB); Simon M. Rowe, Finchampstead (GB); Nicholas S. Arini, Southampton (GB); Piotr Zielinski, Cambridge (GB)

(73) Assignee: Google Inc., Mountain View, CA (US)

( * ) Notice: Subject to any disclaimer, the term of this patent is extended or adjusted under 35 U.S.C. 154(b) by 100 days.

(21) Appl. No.: 13/072,889

(22) Filed: Mar. 28, 2011

(65) Prior Publication Data

US 2012/0254928 A1    Oct. 4, 2012

(51) Int. Cl.
*H04N 7/16* (2011.01)
*H04N 7/173* (2011.01)

(52) U.S. Cl.
USPC ............... 725/112; 725/110; 725/141

(58) Field of Classification Search
USPC ............................. 725/110, 112, 141
See application file for complete search history.

(56) References Cited

U.S. PATENT DOCUMENTS

| | | | |
|---|---|---|---|
| 5,933,829 A | 8/1999 | Durst et al. | |
| 5,978,773 A | 11/1999 | Hudetz et al. | |
| 6,108,656 A | 8/2000 | Durst et al. | |
| 6,199,048 B1 | 3/2001 | Hudetz et al. | |
| 6,430,554 B1 | 8/2002 | Rothschild | |
| 6,434,561 B1 | 8/2002 | Durst, Jr. et al. | |
| 6,542,933 B1 | 4/2003 | Durst, Jr. et al. | |
| 6,651,053 B1 | 11/2003 | Rothschild | |
| 6,745,234 B1 | 6/2004 | Philyaw et al. | |
| 6,765,165 B1 | 7/2004 | Torrens | |
| 6,766,363 B1 | 7/2004 | Rothschild | |
| 6,865,608 B2 | 3/2005 | Hunter | |
| 6,993,573 B2 | 1/2006 | Hunter | |
| 7,314,178 B2 | 1/2008 | Rines et al. | |
| 7,383,209 B2 | 6/2008 | Hudetz et al. | |
| 7,430,588 B2 | 9/2008 | Hunter | |
| 2002/0162121 A1 * | 10/2002 | Mitchell | 725/135 |
| 2008/0002021 A1 | 1/2008 | Guo et al. | |
| 2008/0092164 A1 | 4/2008 | Agarwal et al. | |
| 2008/0148316 A1 | 6/2008 | Kang et al. | |

FOREIGN PATENT DOCUMENTS

KR    10-2007-0097678 A    10/2007

OTHER PUBLICATIONS

PCT Notification of Transmittal of International Search Report and Written Opinion of the International Searching Authority from International Application No. PCT/US2012/030528, dated Oct. 31, 2012, (9 pages).

* cited by examiner

*Primary Examiner* — Dominic D Saltarelli
(74) *Attorney, Agent, or Firm* — Fish & Richardson P.C.

(57) ABSTRACT

A computer-implemented method includes receiving, from a secondary computing device, a request for enhanced content for a media program, the request comprising information indicative of a communication channel through which the media program is being displayed on a primary computing device; receiving broadcast information indicative of enhanced content for a plurality of communication channels; extracting, from the broadcast information indicative of enhanced content for the plurality of communication channels, broadcast information indicative of enhanced content for the communication channel through which the media program is being displayed on the primary computing device; obtaining, based on the extracted broadcast information, a link to enhanced content for the media program; and sending, to the secondary computing device, the link to enhanced content for the media program.

20 Claims, 5 Drawing Sheets

BROADCASTING LINKS TO ENHANCED CONTENT

TECHNICAL FIELD

This document relates generally to broadcasting links to enhanced content for a media program.

BACKGROUND

Generally, a broadcaster transmits television programs, Internet programs, radio programs and other media programs for viewers and consumers. Television programs, Internet programs, radio programs, media programs, and other broadcast content are examples of "media programs."

In an example, a viewer of a television program views the television program on a television. The viewer may also use a mobile device to browse the Internet while watching television. To provide the viewer with additional content related to the television program, a broadcaster may host a website, a Facebook™ page, a Twitter™ page, and so forth that includes content related to the television program. Through the website, the Facebook™ page, the Twitter™ page, and so forth, viewers can email the broadcaster, post questions to forums sponsored by the broadcaster, participate in online discussions, view additional content related to the television program, and so forth.

In an example, the broadcaster may try to direct a viewer to a website by announcing the name of the website during a television program. For example, a broadcaster may visually display a Uniform Resource Location ("URL") address, a broadcaster email address, a Twitter username, and so forth, during the television program. In another example, the broadcaster may have an announcer speak the URL address, the email address, the Twitter username, and so forth, during an airing of the television program. For example, a viewer may watch a cooking program. During the cooking program, the program's host may announce the URL address from which the viewer can download cooking recipes that are featured on the program.

SUMMARY

In one aspect of the present disclosure, a computer-implemented method includes receiving, from a secondary computing device, a request for enhanced content for a media program, the request including information indicative of a communication channel through which the media program is being displayed on a primary computing device; receiving broadcast information indicative of enhanced content for a plurality of communication channels; extracting, from the broadcast information indicative of enhanced content for the plurality of communication channels, broadcast information indicative of enhanced content for the communication channel through which the media program is being displayed on the primary computing device; obtaining, based on the extracted broadcast information, a link to enhanced content for the media program; and sending, to the secondary computing device, the link to enhanced content for the media program.

Implementations of the disclosure may include one or more of the following features. In some implementations, obtaining includes extracting, from the information indicative of enhanced content, the link to enhanced content. In other implementations, obtaining includes generating, based on the information indicative of enhanced content, the link to enhanced content.

In still other implementations, the information indicative of enhanced content includes the link to enhanced content. In some implementations, the enhanced content includes one or more of (i) a link to websites that are related to the media program, (ii) email addresses that are related to the media program, (iii) images that are related to the media program, and (iv) text that is related to the media program. In other implementations, the broadcast information is included in one or more of a Service Information ("SI") table and a Program Specific Information ("PSI") table.

In another aspect of the disclosure, one or more machine-readable media are configured to store instructions that are executable by one or more processing devices to perform functions including receiving, from a secondary computing device, a request for enhanced content for a media program, the request including information indicative of a communication channel through which the media program is being displayed on a primary computing device; receiving broadcast information indicative of enhanced content for a plurality of communication channels; extracting, from the broadcast information indicative of enhanced content for the plurality of communication channels, broadcast information indicative of enhanced content for the communication channel through which the media program is being displayed on the primary computing device; obtaining, based on the extracted broadcast information, a link to enhanced content for the media program; and sending, to the secondary computing device, the link to enhanced content for the media program. Implementations of, this aspect of the present disclosure can include one or more of the foregoing features.

In still another aspect of the disclosure, an electronic system includes one or more processing devices; and one or more machine-readable media configured to store instructions that are executable by the one or more processing devices to perform functions including: receiving, from a secondary computing device, a request for enhanced content for a media program, the request including information indicative of a communication channel through which the media program is being displayed on a primary computing device; receiving broadcast information indicative of enhanced content for a plurality of communication channels; extracting, from the broadcast information indicative of enhanced content for the plurality of communication channels, broadcast information indicative of enhanced content for the communication channel through which the media program is being displayed on the primary computing device; obtaining, based on the extracted broadcast information, a link to enhanced content for the media program; and sending, to the secondary computing device, the link to enhanced content for the media program. Implementations of this aspect of the present disclosure can include one or more of the foregoing features.

In yet another aspect of the disclosure, an electronic system includes means for receiving, from a secondary computing device, a request for enhanced content for a media program, the request including information indicative of a communication channel through which the media program is being displayed on a primary computing device; means for receiving broadcast information indicative of enhanced content for a plurality of communication channels; means for extracting, from the broadcast information indicative of enhanced content for the plurality of communication channels, broadcast information indicative of enhanced content for the communication channel through which the media program is being displayed on the primary computing device; means for obtaining, based on the extracted broadcast information, a link to enhanced content for the media program; and means for sending, to the secondary computing device, the link to enhanced content for the media program. Implementations of this aspect of the present disclosure can include one or more of the foregoing features.

In still another aspect of the disclosure a computer-implemented method includes receiving channel information, the channel information specifying a channel for a media program that is being displayed on a primary device; receiving, from a broadcasting device, broadcast information for one or more channels, the broadcast information including information indicative of enhanced content that is associated with the media program being displayed on the primary device; determining, based on the channel that is broadcasting the media program that is being displayed on the primary device, a portion of the broadcast information that pertains to the media program being displayed on the primary device; extracting, from the portion of the broadcast information, the information indicative of enhanced content for the media program that is being displayed on the primary device; generating, based on the information indicative of enhanced content for the media program that is being displayed on the primary device, a link to enhanced content for the media program that is being displayed on the primary device; broadcasting, to a secondary device, the link to enhanced content for the media program that is being displayed on the primary device; and causing the secondary device to: use the link to enhanced content for the media program that is being displayed on the primary device to retrieve the enhanced content for the media program that is being displayed on the primary device; and display a visual representation of enhanced content for the media program that is being displayed on the primary device. Implementations of this aspect of the present disclosure can include one or more of the foregoing features.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
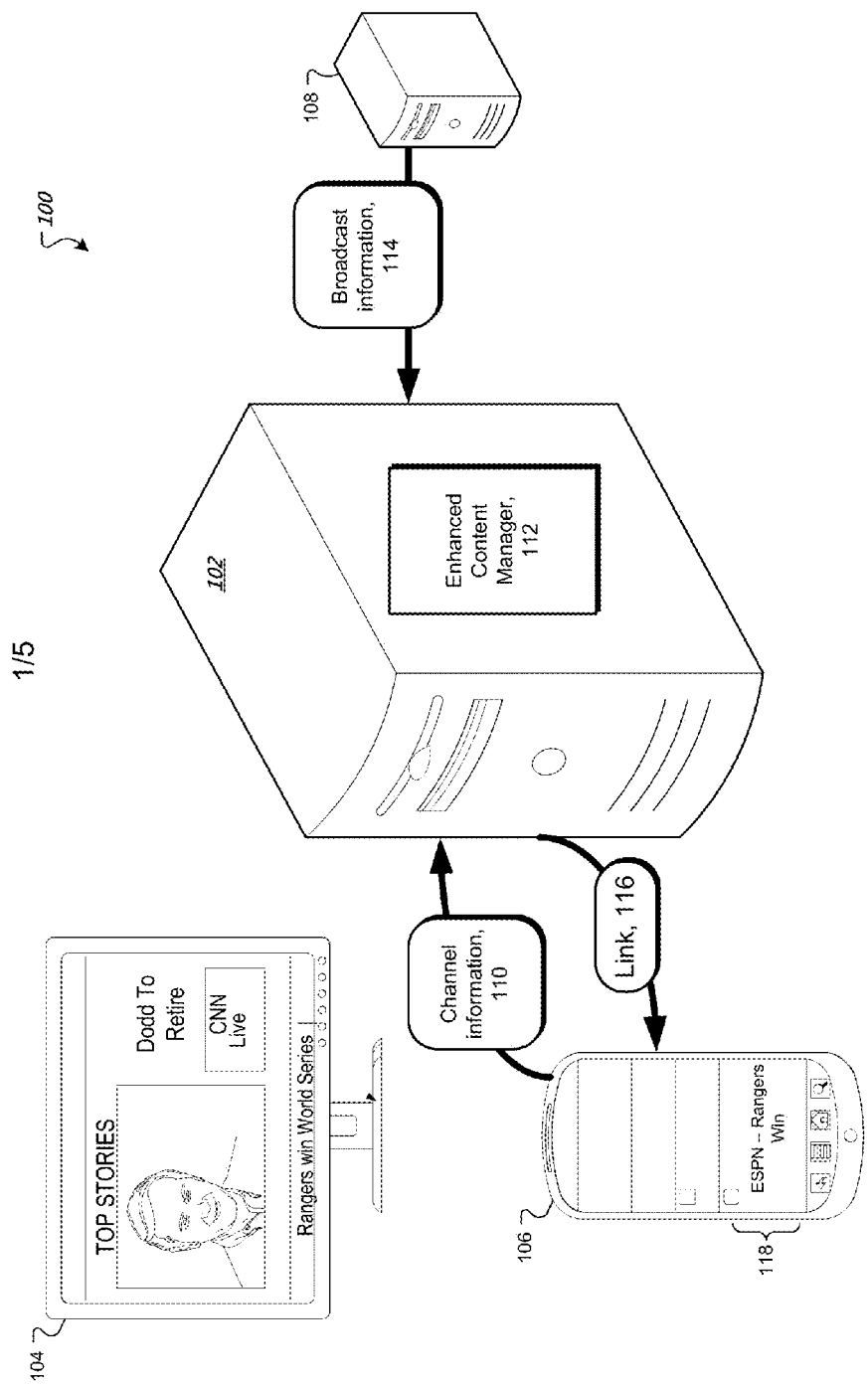
FIG. 1 is a conceptual diagram of a system for broadcasting links to enhanced content.

Described herein is a system that broadcasts data to "enhanced content" for media programs. Generally, the term "enhanced content" includes information that is related to media programs. For example, enhanced content may include links to websites that are related to a television program, email addresses that are related to the television program, images that are related to the television program, text that is related to the television program, and so forth. Accordingly, data to enhanced content includes links, text, Hyper-Text Mark-up Language ("HTML") snippets, small images, and so forth, which are collectively referred to herein as "links to enhanced content" (without limitation and for purposes of convenience).

In an example, a viewer is watching a television program on a television. While the viewer watches the television program, the viewer also uses a mobile device. Through the mobile device, the viewer receives enhanced content for the television program. In this example, the television acts as a "primary device," including, e.g., a device that displays the media program for which enhanced content is provided by a broadcaster. The mobile device acts as a "secondary device," including, e.g., a device that displays the enhanced content for the media program.

In this example, the system determines the television channel on which the television program is broadcast. Based on the determined television channel, the system generates "links to enhanced content" for the television channel. "Links to enhanced content" include formatted segments of text that specify a location from which enhanced content may be accessed. In an example, a link to enhanced content may include a URL address of a website that includes enhanced content, including, information relevant to a media program being viewed by a viewer.

To generate the links to enhanced content, the system uses "broadcast information" that is transmitted by a broadcaster. Generally, broadcast information includes metadata related to media programs, including, e.g., information specifying related programs, links to television programs, links to whole series of television programs, information indicative of enhanced content, and so forth.

In an example, the information indicative of enhanced content may include links to enhanced content. In this example, the system extracts the links to enhanced content directly from the broadcast information and sends the links to enhanced content to a secondary device. In another example, rather than directly including the links to enhanced content, the information indicative of enhanced content includes information that may be used by the system to generate the links to enhanced content. In this example, the information indicative of enhanced content includes a name of a provider that hosts the enhanced content. The system uses the name of the provider to look-up (e.g., by accessing a Domain Name System ("DNS") look-up table) a virtual address associated with the provider. Based on the virtual address, the system generates a link to enhanced content.

The system sends the link to enhanced content to the secondary device. In an example, the secondary device may use the link to enhanced content to access and to display the enhanced content, e.g., a website, while a viewer is viewing a media program. In another example, a user associated with the secondary device may use the link to enhanced content to access and to display the enhanced content.

FIG. 1 is a conceptual diagram of system 100 for broadcasting links to enhanced content. System 100 includes server 102, programming device 104, client device 106, and broadcasting device 108.

Server 102 includes enhanced content manager 112. Enhanced content manager 112 listens for and receives broadcast information 114 from broadcasting device 108. In the example of FIG. 1, broadcast information 114 includes information for a number of channels, including, e.g., channels 4, 5 and 7. Server 102 stores broadcast information 114 to access broadcast information 114 at a later time.

In the example of FIG. 1, a viewer (not shown) views a television program on programming device 104. In this example, programming device 104 is a computer, which we refer to as a primary device. The viewer also browses the Internet on client device 106, while watching the television program. To receive enhanced content, the viewer accesses an application (not shown) running on client device 106.

The application allows the viewer to select the channel that is broadcasting the television program being viewed by the viewer. For example, the application may include a list of all possible channels that may be displayed on programming device 104. In this example, programming device 104 is configured to display channels 1-150. Accordingly, the application provides a corresponding list of channels 1-150 from which a viewer may select a channel.

In the example of FIG. 1, the viewer watches a television program on channel 5. The viewer accesses the application that is running on client device 106. As previously described, the application displays a list of channels. In this example, the viewer selects channel 5 from the list of channels, because channel 5 is broadcasting the television program that the viewer is watching. The application generates channel information 110, which includes information specifying the channel (e.g., channel 5) that is broadcasting the television program being viewed by the viewer. Client device 104 sends channel information 110 to server 102.

In response to receiving channel information 110, enhanced content manager 112 determines a link to enhanced content for channel 5. In this example, enhanced content manager 112 retrieves broadcast information 114 from broadcasting device 108. In another example, broadcasting device 108 transfers data and other broadcast information over the air (e.g., by embedding the data into the broadcaster's digital TV signal) to server 102.

In the example of FIG. 1, enhanced content manager 112 determines a portion of broadcast information 114 that pertains to channel 5. The portion of broadcast information 114 that pertains to channel 5 includes link 116 to enhanced content for channel 5. Enhanced content manager 112 extracts link 116 to enhanced content for channel 5 from broadcast information 114. Enhanced content manager 112 sends link 116 to enhanced content to client device 106. In response to receiving link 116 to enhanced content, client device 106 uses link 116 to enhanced content to access the enhanced content for channel 5. In the example of FIG. 1, client device 106 displays visual representation 118 of enhanced content for channel 5.

Figure 2:
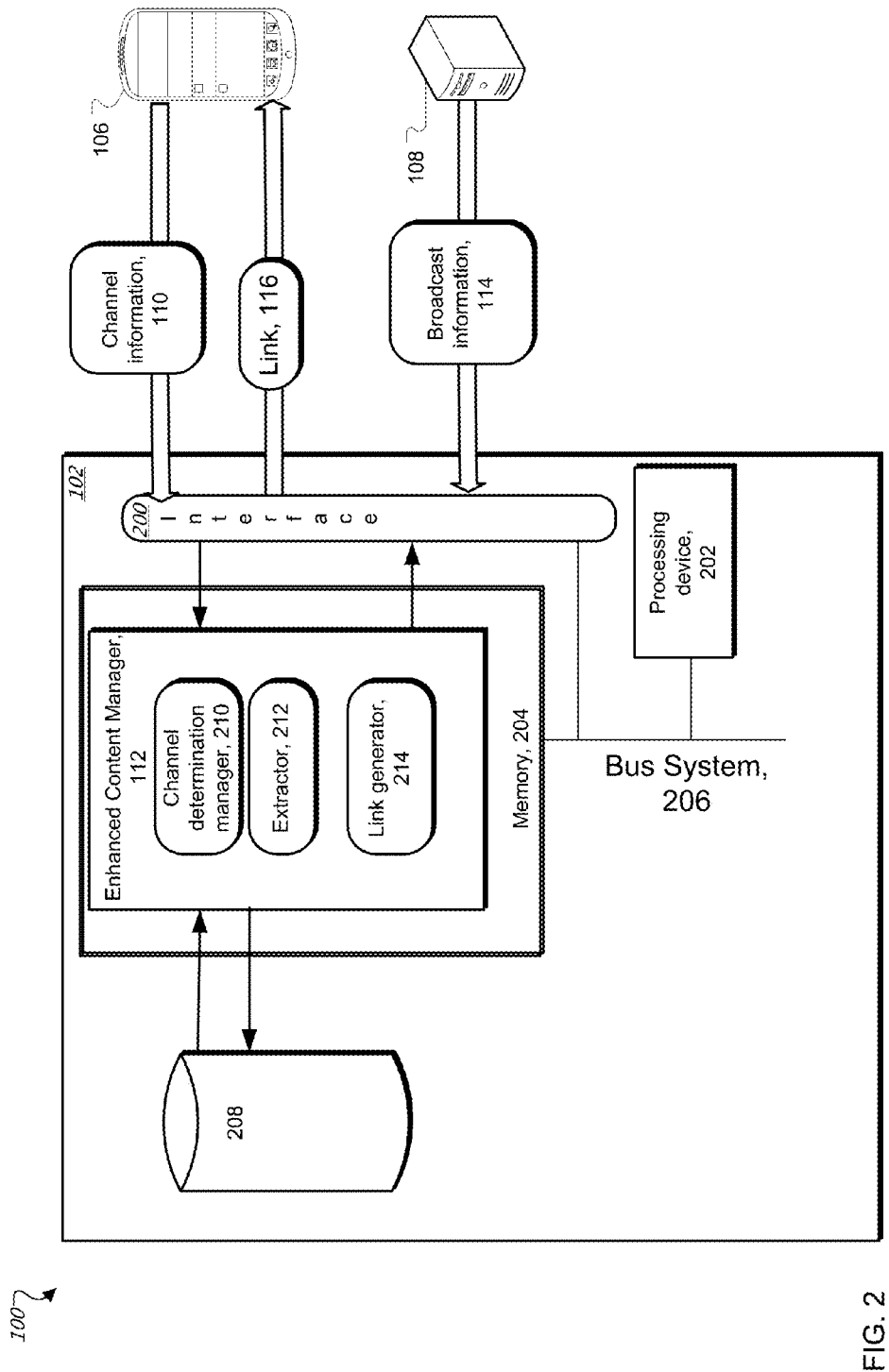
FIG. 2 is a block diagram of components of the system for broadcasting links to enhanced content.

FIG. 2 is a block diagram of components of system 100 for broadcasting links to enhanced content (programming device 104 is not shown). Client device 106 and broadcasting device 108 can be any sort of computing devices capable of taking input from a user and communicating over a network (not shown) with server 102 and/or with other client devices. For example, client device 106 and broadcasting device 108 can be mobile devices, desktop computers, laptops, cell phones, personal digital assistants ("PDAs"), servers, embedded computing systems, and so forth. Additionally, broadcasting device 108 could include a television source that is configured to broadcast television content for consumers and viewers.

Server 102 can be any of a variety of computing devices capable of receiving information, such as a server, a distributed computing system, a desktop computer, a laptop, a cell phone, a rack-mounted server, and so forth. Server 102 may be a single server or a group of servers that are at a same location or at different locations.

Server 102 can receive information from client device 106 and broadcasting device 108 via input/output ("I/O") interface 200. I/O interface 200 can be any type of interface capable of receiving information over a network, such as an Ethernet interface, a wireless networking interface, a fiber-optic networking interface, a modem, and so forth. Server 102 also includes a processing device 202 and memory 204. A bus system 206, including, for example, a data bus and a motherboard, can be used to establish and to control data communication between the components of server 102.

Processing device 202 may include one or more microprocessors. Generally speaking, processing device 202 may include any appropriate processor and/or logic that is capable of receiving and storing data, and of communicating over a network (not shown). Memory 204 can include a hard drive and a random access memory storage device, such as a dynamic random access memory, or other types of non-transitory machine-readable storage devices. As shown in FIG. 2, memory 204 stores computer programs that are executable by processing device 202. Among these computer programs are channel determination manager 210, extractor 212, and link generator 214, each of which are described in further detail below.

In the example of FIG. 2, broadcasting device 108 sends broadcast information 114 to server 102. Broadcasting device 108 may transmit broadcast information 114 (which may include links to enhanced content) as part of a television signal, for example, a Digital television signal, which also includes the audio/video data for a channel.

Broadcast information 114 may be carried in Service Information ("SI") and Program Specific Information ("PSI") tables, including those defined in the International Organization for Standardization/the International Electrotechnical Commission ("ISO/IEC") 13818-1 (MPEG-2) specification, (see ISO/IEC 13818-1: Generic coding of moving pictures and associated audio information systems, which includes a description of transport streams and the data they may include), the European Telecommunications Standards Institute ("ETSI") EN 300-468 (Digital Video Broadcasting or "DVB") specification (see ETSI EN 300 468: Specification for Service Information (SI) in DVB systems, which includes a description of PSI/SI tables in DVB systems including Event Information Tables ("EITs"), which may be accessed at http://www.etsi.org/deliver/etsi_en/300400_300499/300468/01.11.01_60/en_300468 v011101p.pdf), and the A/65:2009 (Advanced Television Systems Committee or "ATSC") specification (see A/65:2009: Program And System Information Protocol For Terrestrial Broadcast And Cable, which includes a description of PSI/SI tables in ATSC systems, which may be access at http://www.atsc.org/cros/standards/a_65-2009.pdf).

Examples of tables which may include broadcast information include PMTs, EITs, and Related Content Tables ("RCTs"). A description of RCTs may be found in "ETSI TS 102 323: Carriage and signaling of TV-Anytime information in DVB transport streams," which may be accessed at http://www.etsi.org/deliver/etsi_ts/102300_102399/102323/01.04.01_60/102,323v 010401p.pdf. Broadcast information 114 including links to enhanced content may also be broadcast as a "Private Data Stream" inside a MPEG-2 Transport Stream.

The content of the table changes dynamically as the content of media programs are changed by a broadcaster. That is, as the content of media programs change, broadcasters update broadcast information 114 to correspond to the changing media programs. In an example, broadcasting device 108 periodically transmits to server 102 a table including updated broadcast information.

Server 102 receives broadcast information 114 from broadcasting device 108. I/O interface 200 provides broadcast information 114 to enhanced content manager 112, which stores broadcast information 114 in data repository 208. In an example, broadcast information 114 includes information for various broadcasting channels. In this example, enhanced content manager 112 stores broadcast information 114 in data repository 208 based on a channel associated with broadcast information 114.

In an example, broadcast information 114 includes information for television channels 5, 7, and 10. In this example, enhanced content manager 112 parses broadcast information 114 to determine a portion of broadcast information 114 that is related to television channel 5. Enhanced content manager 112 saves in data repository 208 the portion of broadcast information 114 that is related to television channel 5. This portion of broadcast information 114 is saved in a table and/or other data structure that is associated with television channel 5.

Enhanced content manager 112 also parses broadcast information 114 to determine portions of broadcast information 114 that are related to television channels 7 and 10, respectively. Enhanced content manager 112 saves in data repository 208 the portions of broadcast information 114 that are related to television channels 7 and 10. These portions of broadcast information 114 are saved in a table and/or other data structure that is associated with television channels 7 and 10, respectively.

Enhanced content manager 112 includes channel determination manager 210, extractor 212, and link generator 214. Channel determination manager 210 is configured to determine a channel and/or a media program that is being displayed on a primary device. Channel determination manager 210 determines a channel that is being displayed on a primary device in a number of ways, including, using information included in channel information, using "audio fingerprinting," and querying a set-top box ("STB") or set-top unit ("STU"), which may be connected to programming device 104, for information specifying a channel that is being displayed on programming device 104.

In an example, channel determination manager 210 uses channel information 110 to determine a channel that is being displayed on a primary device. As described above, channel information 110 includes information specifying that channel 5 is being displayed on programming device 104. In this example, by parsing the contents of channel information 110, channel determination manager 210 identifies the channel, namely channel 5, that is being displayed on the primary device.

In another example, channel determination manager 210 uses "audio fingerprinting" to determine a channel that is being displayed on a primary device. An audio fingerprint is a condensed digital summary, generated from an audio signal that can be used to determine an audio file, such as a television program, a song, or an advertisement in an audio database. In this example, client device 104 is configured to generate and to transmit an audio fingerprint to server 102. Channel determination manager 210 accesses an audio database (not shown) to determine an identifier of the audio file that is being transmitted from broadcasting device 108 to programming device 104.

In this example, the audio database includes a mapping of channels to identifiers of audio files. Accordingly, once channel determination manager 210 determines the identifier of the audio file that is being transmitted to programming device 104, channel determination manager 210 may also use the mapping to determine the channel that is being displayed on the primary device.

Once channel determination manager 210 has identified the channel that is being displayed on the primary device, channel determination manager 210 sends information specifying the identified channel to extractor 212. Extractor 212 accesses data repository 208 and retrieves a portion of broadcast information 114 associated with the identified channel. In an example, broadcast information 114 includes broadcast information for channels 5, 7, and 10. In this example, channel 5 corresponds to the identified channel. Accordingly, extractor 212 retrieves the portion of broadcast information 114 that corresponds to channel 5.

As described above, the portion of broadcast information 114 associated with the identified channel may include various types of metadata. Extractor 212 is configured to extract information indicative of enhanced content from the portion of broadcast information 114 that is associated with the identified channel. Extractor 212 sends the information indicative of enhanced content to link generator 214. Link generator 214 is configured to generate link 116 to enhanced content, for example, by formatting the information indicative of enhanced content and/or by using a DNS look-up table to retrieve an address of the enhanced content.

In an example, information indicative of enhanced content includes link 116 to enhanced content. In this example, link generator 214 may not need to generate link 116 to enhanced content. Rather, extractor 212 may extract link 116 to enhanced content directly from the portion of broadcast information 114 associated with the identified channel. Extractor 212 directly sends link 116 to enhanced content to client device 106.

Figure 3:
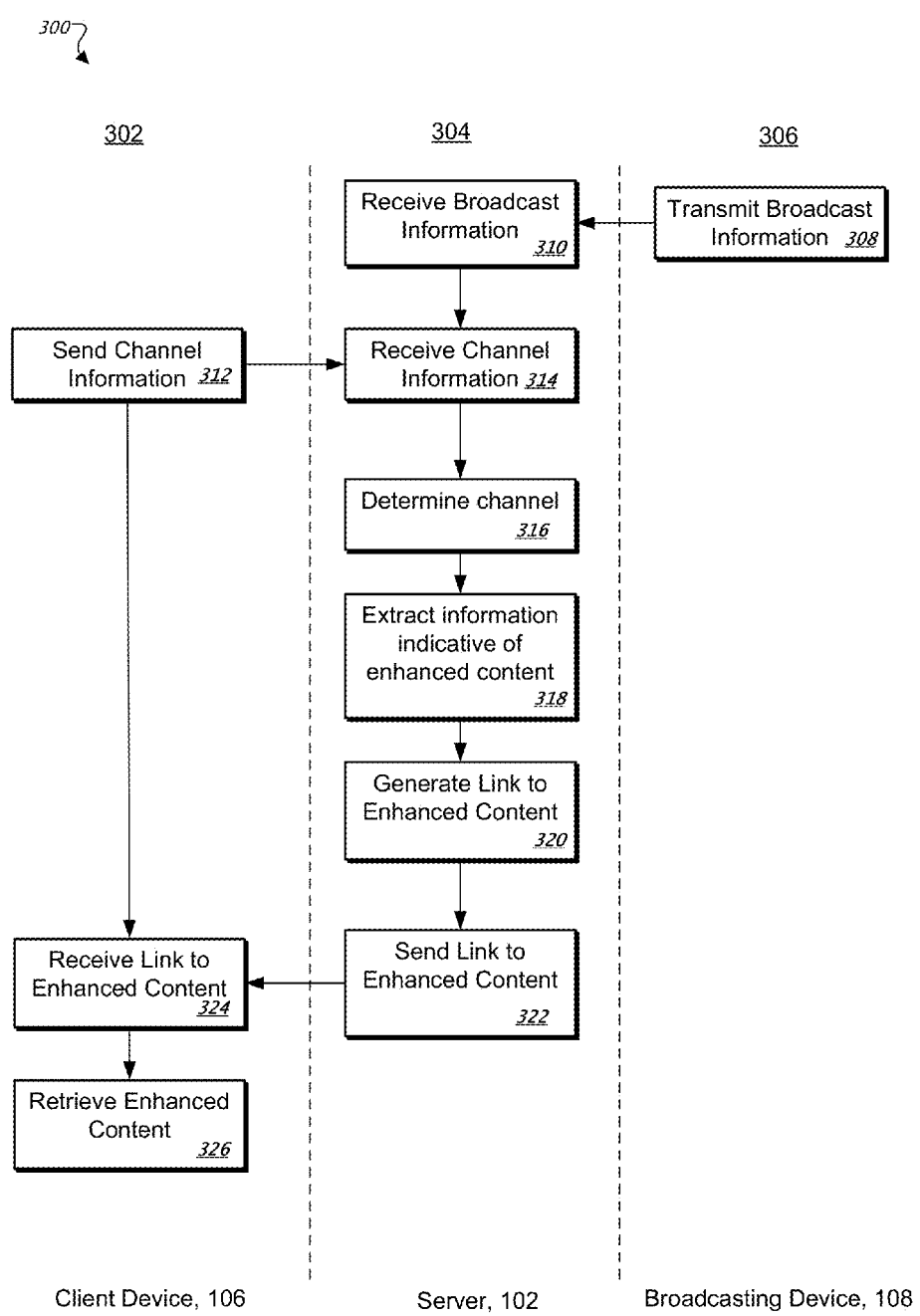
FIG. 3 is a flowchart showing a process for broadcasting links to enhanced content.

FIG. 3 is a flowchart showing a process 300 for broadcasting links to enhanced content. In FIG. 3, process 300 is split into a left part 302, which is performed on client device 106, a center part 304, which is performed on server 102, and a right part 306, which is performed on broadcasting device 108.

Process 300 may be initiated from broadcasting device 108. Specifically, broadcasting device 108 transmits (308) broadcast information 114 to server 102. Server 102 receives (310) broadcast information 114. Additionally, client device 106 sends (312) channel information 110 to server 102, for example, using an Internet Protocol ("IP") message or other data message format. Server 102 receives (314) channel information 110. Channel determination manager 210 uses channel information 110 to determine (316) the channel that is being displayed on programming device 104 (FIG. 1).

Channel determination manager 210 passes (not shown) to extractor 212 information specifying the channel that is being displayed on programming device 104. Extractor 212 retrieves (not shown) broadcast information 114 from data repository 208. Extractor 212 determines (not shown) a portion of broadcast information 114 that is associated with the channel that is being displayed on programming device 104. From the portion, extractor 212 extracts (318) information indicative of enhanced content for the channel that is being displayed on programming device 104.

Extractor 212 sends (not shown) to link generator 214 the information indicative of enhanced content. Based on the information indicative of enhanced content, link generator 214 generates (320) link 116 (FIGS. 1 and 2) to enhanced content and sends (322) link 116 to enhanced content to client device 106. Client device 106 receives (324) link 116 to enhanced content and retrieves (326) enhanced content using link 116 to enhanced content.

In a variation of process 300, channel determination manager 210 receives channel information via an audio fingerprint, for example, sent from programming device 104. In another variation of process 300, the foregoing actions are based on the media program that is being displayed on programming device 104, rather than the channel that is being displayed on programming device 104.

Figure 4:
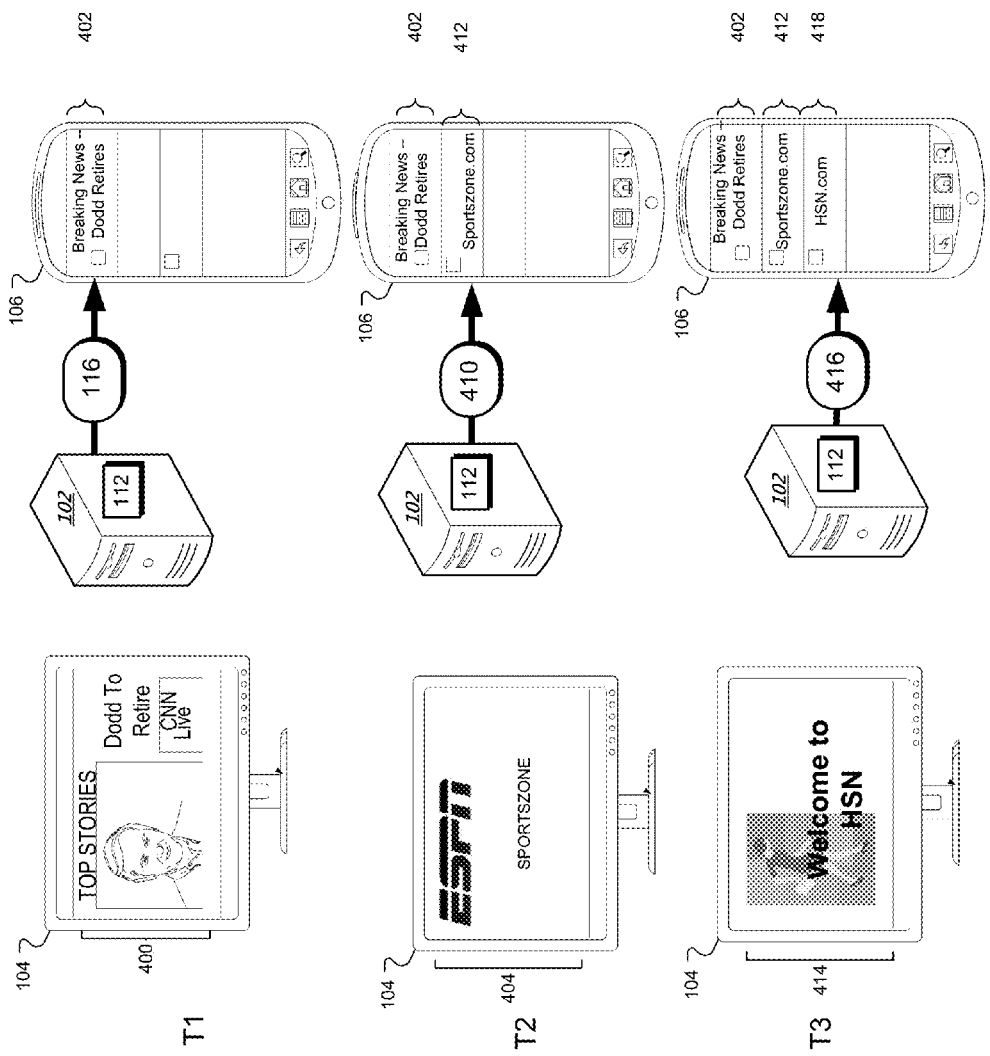
FIG. 4 shows an example of changing links to enhanced content as the content of media programs is changed on a primary device.

FIG. 4 shows an example of changing links to enhanced content as the content of media programs is changed on a primary device. The media programs viewed by a viewer on a primary device may change over time, for example, as the viewer changes a television channel, as commercials are run, as the content in a single, television program changes as a progression of time, and so forth.

In the example of FIG. 4, at a first point in time ("T1"), a broadcaster broadcasts television program 400 to programming device 104. As a viewer watches television program 400, the viewer is also engaged with client device 106. Using the techniques described herein, enhanced content manager 112 generates link 116 to enhanced content associated with television program 400. Client device 106 receives link 116 to enhanced content and uses link 116 to enhanced content to access enhanced content 402 for television program 400.

At another point in time ("T2"), the viewer watches another television program, namely, television program 404. Using the techniques described herein, enhanced content manager 112 generates link 410 to enhanced content for television program 404. Client device 106 receives link 410 and uses link 410 to access enhanced content 412 for television program 404.

At yet another point in time ("T3"), the viewer watches still another television program, namely, television program 414. Using the techniques described herein, enhanced content manager 112 generates link 416 to enhanced content for television program 414. Client device 106 receives link 416 to enhanced content and uses link 416 to access enhanced content 418 for television program 414.

Television programs 400, 404, 414 may include content specifying commercials, content associated with different television programs broadcast on different television channels, and so forth. In an example, television programs 400, 404, 414 represent television programs broadcast on channels different from each other. In this example, at T1, the viewer watches television program 400. At T2, the viewer switches television channels to watch television program 404. At T3, the viewer additionally switches television channels to watch television program 414.

In another example, television program 404 represents a commercial that is run during television programs 400, 414. In yet another example, television programs 400, 404, 414 represent content associated with various segments of a single television program. In this example, television program 400 represents the first 10 minutes of a television program. Television program 404 represents the second 10 minutes of the same television program. Television program 414 represents the third 10 minutes of the same television program.

Using the techniques described herein, links to enhanced content are sent to secondary devices, for example, while a viewer watches media programs on a primary device. The viewer's secondary device uses the link to access the enhanced content.

Figure 5:
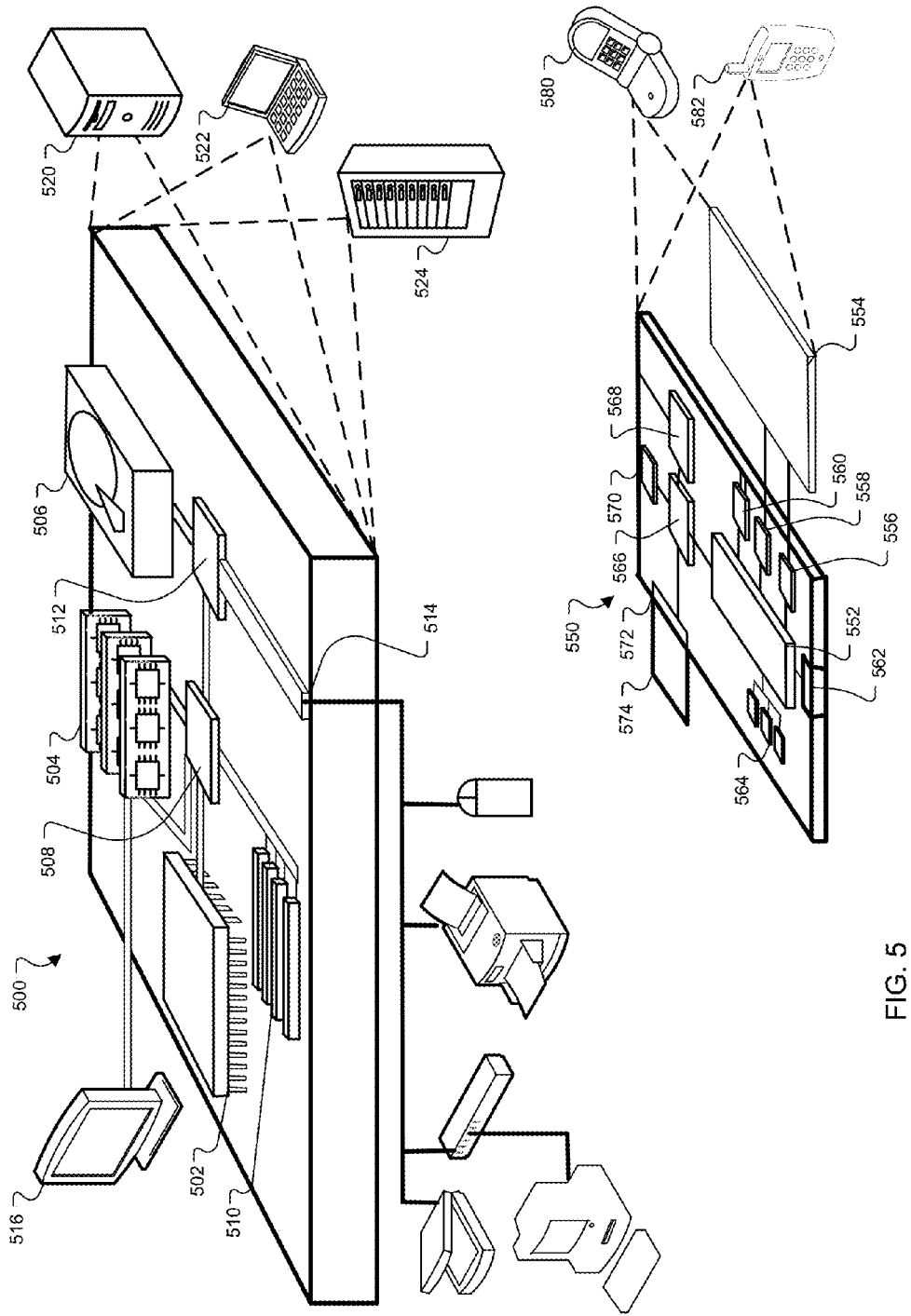
FIG. 5 shows an example of a computer device and a mobile computer device that can be used to implement the techniques described herein.

FIG. 5 shows an example of a computer device 500 and a mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the processes and techniques described herein. For example, the processes described herein could be executed by STB or STU. A STB/STU is a device that connects to a television and an external source of signal, turning the signal into content which is then displayed on the television screen or other display device.

In another example, using the techniques described herein, links to enhanced content may be generated for pre-recorded programs, in which the information indicative of enhanced content may be recorded into the data stream as broadcast information. That is, information indicative of enhanced content does not have to be inserted in real-time into the broadcast information by the broadcaster, and information indicative of enhanced content may be inserted into the broadcast information during the production stage.

In an example, during an editing stage of a first section of a pre-recorded cooking show, information indicative of enhanced content (e.g., extra-content-data) may be inserted into the program. The information indicative of enhanced content may point at a web page including a recipe for a first meal featured in the cooking show. Later on, when a second meal is being prepared, the information indicative of enhanced content may be updated to point at the recipe for the second meal.

In yet another example, information indicative of enhanced content for pre-recorded shows may be specified in at least the following, two ways. First, information indicative of enhanced content may be applicable to a current moment for a current channel. That is, the information indicative of enhanced content becomes "active" (or relevant) from the instant that it is broadcast. In this example, server 102 continuously monitors for broadcast information.

Second, information indicative of enhanced content may be broadcast as part of a program's details in advance. In this example, information indicative of enhanced content includes a "time-offset" (from the beginning of the program) that determines when the information indicative of enhanced content becomes "active".

For example, for a pre-recorded cooking show, the broadcaster may indicate that a first meal is going to be prepared from time offset 3:03 until 10:05, and therefore it can indicate that the applicable information indicative of enhanced content for that time interval includes "brodcaster.com/cooking-show/meal1-recipe.html". Another time interval for a second meals recipe may be broadcast as part of the program details (e.g. as part of DVB and/or ATSC EIT), which may not require constant monitoring of broadcast information as the "active" information indicative of enhanced content for each interval during the show will be known in advance by server 102.

In yet another example, the links to enhanced content do not require specially-authored content. Rather, the links to enhanced content use complementary web content related to TV shows that has already been generated by broadcasters and others. That is, the links to enhanced content provide the missing link from the actual TV content to the web content. In still another example, the enhanced content is viewed on a primary device, for example using a web-enabled STB.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

Accordingly, other embodiments not specifically described herein are also within the scope of the following claims.

What is claimed is:

1. A computer-implemented method comprising:
   receiving, from a secondary computing device and by a server device configured to provide content to computing devices in a plurality of geographic locations, a request for enhanced content for a media program displayed on a primary computing device, the request comprising audio information generated by the primary computing device and indicative of a communication channel through which the media program is being displayed on the primary computing device;
   receiving, by the server device from a broadcasting device, broadcast information indicative of enhanced content for a plurality of communication channels;
   extracting, by the server device from the broadcast information indicative of enhanced content for the plurality of communication channels, broadcast information indicative of enhanced content for the communication channel through which the media program is being displayed on the primary computing device;
   generating, by the server device, based on the extracted broadcast information, a link to enhanced content for the media program; and
   sending, by the server device to the secondary computing device, the link to enhanced content for the media program.

2. The computer-implemented method of claim 1, wherein generating comprises:
   extracting, from the broadcast information indicative of enhanced content for the communication channel through which the media program is being displayed on the primary computer device, the link to enhanced content.

3. The computer-implemented method of claim 1, wherein generating comprises:
   obtaining, based on the broadcast information indicative of enhanced content for the communication channel through which the media program is being displayed on the primary computing device, the link to enhanced content.

4. The computer-implemented method of claim 1, wherein the broadcast information indicative of enhanced content for the plurality of communication channels comprises the link to enhanced content.

5. The computer-implemented method of claim 1, wherein the enhanced content comprises one or more of (i) a link to websites that are related to the media program, (ii) email addresses that are related to the media program, (iii) images that are related to the media program, and (iv) text that is related to the media program.

6. The computer-implemented method of claim 1, wherein the broadcast information indicative of enhanced content for the plurality of communication channels is included in one or more of a Service Information ("SI") table and a Program Specific Information ("PSI") table.

7. One or more non-transitory machine-readable media configured to store instructions that are executable by one or more processing devices to perform operations comprising:
receiving, from a secondary computing device and by the one or more processing devices, a request for enhanced content for a media program displayed on a primary computing device, the request comprising audio information generated by the primary computing device and indicative of a communication channel through which the media program is being displayed on the primary computing device, with at least one of the one or more processing devices being configured to provide content to computing devices in a plurality of geographic locations;
receiving, by the one or more processing devices from a broadcasting device, broadcast information indicative of enhanced content for a plurality of communication channels;
extracting, by the one or more processing devices from the broadcast information indicative of enhanced content for the plurality of communication channels, broadcast information indicative of enhanced content for the communication channel through which the media program is being displayed on the primary computing device;
generating, by the one or more processing devices, based on the extracted broadcast information, a link to enhanced content for the media program; and
sending, by the one or more processing devices to the secondary computing device, the link to enhanced content for the media program.

8. The one or more non-transitory machine-readable media of claim 7, wherein generating comprises:
extracting, from the broadcast information indicative of enhanced content for the communication channel through which the media program is being displayed on the primary computing device, the link to enhanced content.

9. The one or more non-transitory machine-readable media of claim 7, wherein generating comprises:
obtaining, based on the broadcast information indicative of enhanced content for the communication channel through which the media program is being displayed on the primary computing device, the link to enhanced content.

10. The one or more non-transitory machine-readable media of claim 7, wherein the broadcast information indicative of enhanced content for the plurality of communication channels comprises the link to enhanced content.

11. The one or more non-transitory machine-readable media of claim 7, wherein the enhanced content comprises one or more of (i) a link to websites that are related to the media program, (ii) email addresses that are related to the media program, (iii) images that are related to the media program, and (iv) text that is related to the media program.

12. The one or more non-transitory machine-readable media of claim 7, wherein the broadcast information indicative of enhanced content for the plurality of communication channels is included in one or more of a Service Information ("SI") table and a Program Specific Information ("PSI") table.

13. An electronic system comprising:
one or more processing devices; and
one or more machine-readable media configured to store instructions that are executable by the one or more processing devices to perform operations comprising:
receiving, from a secondary computing device and by the one or more processing devices, a request for enhanced content for a media program displayed on a primary computing device, the request comprising audio information generated by the primary computing device and indicative of a communication channel through which the media program is being displayed on the primary computing device, with at least one of the one or more processing devices being configured to provide content to computing devices in a plurality of geographic locations;
receiving, by the one or more processing devices from a broadcasting device, broadcast information indicative of enhanced content for a plurality of communication channels;
extracting, by the one or more processing devices, from the broadcast information indicative of enhanced content for the plurality of communication channels, broadcast information indicative of enhanced content for the communication channel through which the media program is being displayed on the primary computing device;
generating, by the one or more processing devices, based on the extracted broadcast information, a link to enhanced content for the media program; and
sending, by the one or more processing devices to the secondary computing device, the link to enhanced content for the media program.

14. The electronic system of claim 13, wherein the generating comprises:
extracting, from the broadcast information indicative of enhanced content for the communication channel through which the media program is being displayed on the primary computing device, the link to enhanced content.

15. The electronic system of claim 13, wherein generating comprises:
obtaining, based on the broadcast information indicative of enhanced content for the communication channel through which the media program is being displayed on the primary computing device, the link to enhanced content.

16. The electronic system of claim 13, wherein the broadcast information indicative of enhanced content for the plurality of communication channels comprises the link to enhanced content.

17. The electronic system of claim 13, wherein the enhanced content comprises one or more of (i) a link to websites that are related to the media program, (ii) email addresses that are related to the media program, (iii) images that are related to the media program, and (iv) text that is related to the media program.

18. The electronic system of claim 13, wherein the broadcast information indicative of enhanced content for the plurality of communication channels is included in one or more of a Service Information ("SI") table and a Program Specific Information ("PSI") table.

19. An electronic system comprising:
    means for receiving, from a secondary computing device and by a server device configured to provide content to computing devices in a plurality of geographic locations, a request for enhanced content for a media program displayed on a primary computing device, the request comprising audio information generated by the primary computing device and indicative of a communication channel through which the media program is being displayed on the primary computing device;
    means for receiving, by the server device, from the broadcast information indicative of enhanced content for a plurality of communication channels;
    means for extracting, by the server device, from the broadcast information indicative of enhanced content for the plurality of communication channels, broadcast information indicative of enhanced content for the communication channel through which the media program is being displayed on the primary computing device;
    means for generating, by the server device, based on the extracted broadcast information, a link to enhanced content for the media program; and
    means for sending, by the server device to the secondary computing device, the link to enhanced content for the media program.

20. A computer-implemented method comprising:
    receiving, by a server device configured to provide content to computing devices in a plurality of geographic locations, channel information that includes audio information generated by a primary device and indicative of a channel for a media program that is being displayed on the primary device;
    receiving, by a server device from a broadcasting device, broadcast information for one or more channels, the broadcast information comprising information indicative of enhanced content that is associated with the media program being displayed on the primary device;
    determining, by a server device, based on the channel that is broadcasting the media program that is being displayed on the primary device, a portion of the broadcast information that pertains to the media program being displayed on the primary device;
    extracting, by the server device from the portion of the broadcast information, the information indicative of enhanced content for the media program that is being displayed on the primary device;
    generating, by the server device based on the information indicative of enhanced content for the media program that is being displayed on the primary device, a link to enhanced content for the media program that is being displayed on the primary device; and
    broadcasting, by the server device to a secondary device, the link to enhanced content for the media program that is being displayed on the primary device.

* * * * *